No. 838,110. PATENTED DEC. 11, 1906.
H. T. HANSEN.
BRAKE MECHANISM.
APPLICATION FILED MAY 1, 1905.
2 SHEETS—SHEET 1.
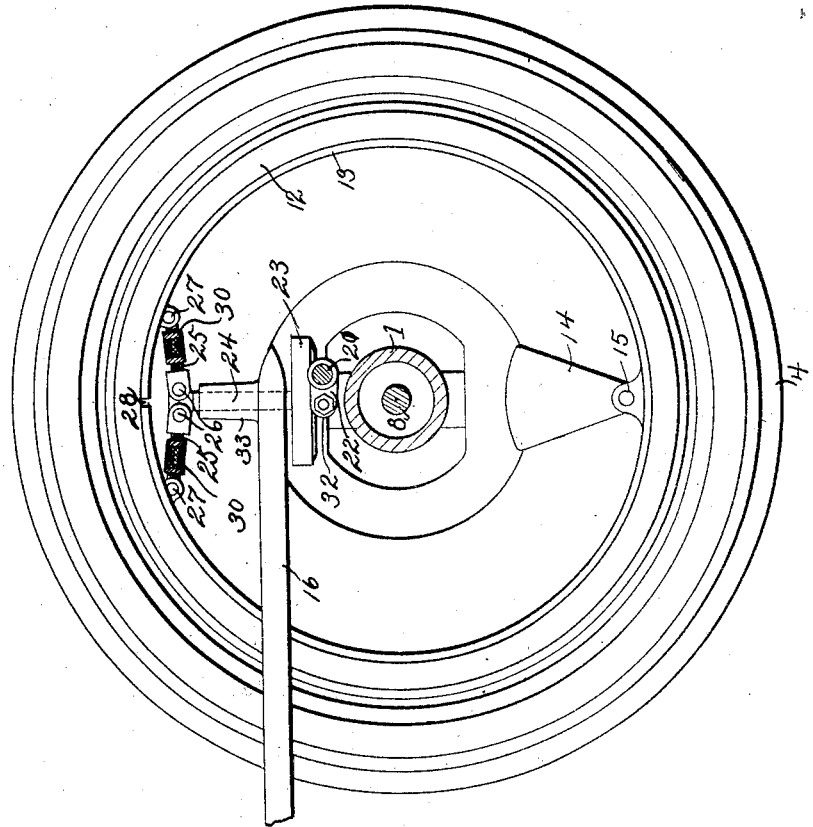
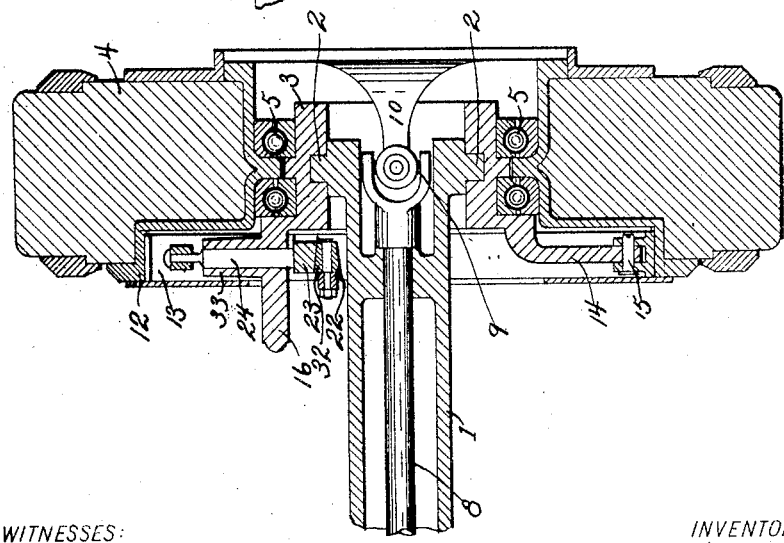
WITNESSES:
INVENTOR
Hans Theodore Hansen
BY Erwin E. Wheeler
ATTORNEYS

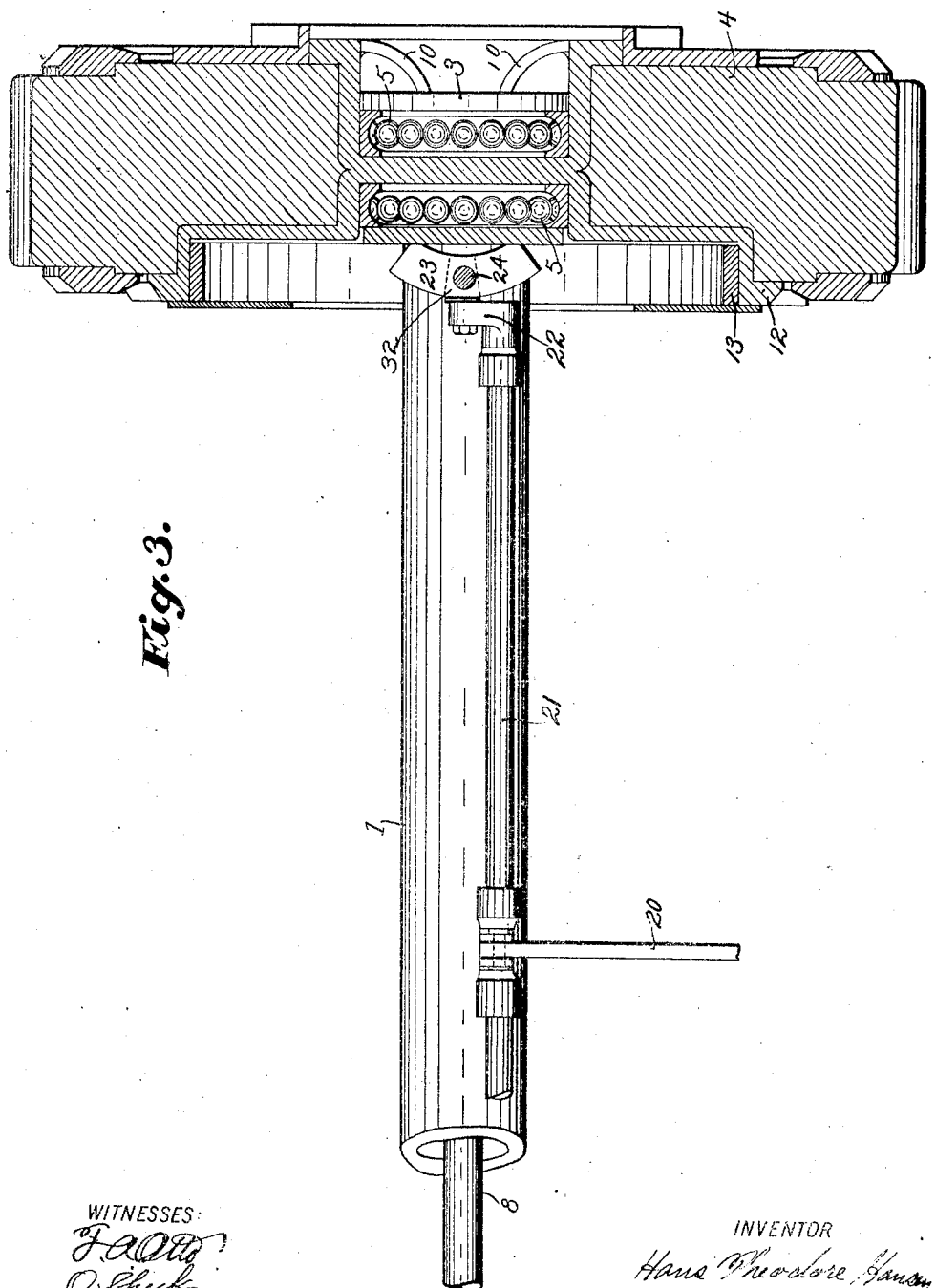

UNITED STATES PATENT OFFICE.

HANS THEODORE HANSEN, OF MILWAUKEE, WISCONSIN, ASSIGNOR TO FOUR WHEEL DRIVE WAGON COMPANY, OF MILWAUKEE, WISCONSIN, A CORPORATION OF WISCONSIN.

BRAKE MECHANISM.

No. 838,110.

Specification of Letters Patent.

Patented Dec. 11, 1906.

Application filed May 1, 1905. Serial No. 258,159.

*To all whom it may concern:*

Be it known that I, HANS THEODORE HANSEN, a citizen of the United States, residing at Milwaukee, county of Milwaukee, and State of Wisconsin, have invented new and useful Improvements in Brake Mechanism, of which the following is a specification.

My invention relates to improvements in brake mechanisms for steering-wheels which are swung to nan axis in the plane of he wheel.

The object of my invention is to provide suitable brake mechanism for wheels of this type.

In the following description reference is had to the accompanying drawings, in which—

Figure 1 is a vertical sectional view of an automobile-wheel embodying my invention and showing a portion of the axle. Fig. 2 is a view of the face of the wheel, showing the axle-driving shaft and brake-operating rod in cross-section. Fig. 3 is a plan view of the parts shown in Fig. 1 with the wheel partially broken away.

Like parts are identified by the same reference characters throughout the several views.

1 is a stationary tubular axle of a motor-driven vehicle. This axle is provided with trunnions 2 at its outer extremity, occupying a position in the vertical axis of wheel oscillation.

3 is an oscillating ring pivotally mounted on the trunnions 2, and this ring supports the wheel 4, which is mounted to turn on the oscillating ring, with interposed ball-bearings 5. The wheel is driven from any suitable motor carried on the vehicle through a shaft 8, connected by universal joint 9 with an inwardly-extending portion 10 of the wheel. These parts may all be of any ordinary construction suitable for the purpose.

The inner face of the wheel is provided with an annular shoulder 12, and a split ring 13 is adapted when spread to bear against the inner face of this shoulder. The ring 13 is supported from the oscillating ring 3 by an arm 14, with which the split ring 13 is pivotally connected at 15, so that when the ring 13 is spread it serves as a band-brake for the wheel. The ring 13 being supported from the oscillating ring 3 it is obvious that it will swing with the ring 3, and therefore maintain its relation to the wheel and the shoulder 12 thereof. The ring 3 is swung to oscillate the wheel by means of a steering-lever 16, and as the split ring 13 is mounted thereon it is adapted to serve as a brake for the wheel in any position of steering adjustment. To set the brake, the ring 13 is spread by means of a lever 20, from which motion is communicated to the ring 13 through a rock-shaft 21, arm 22, segment 23, post 24, and links 25, the latter being pivotally connected at 26 and 27 with the post and ring 13, respectively. The links are connected with the ring 13 at opposite sides of the point of division 28, whereby an upward movement of the arm 22 will lift the post 24 and cause the two halves of the ring to spread under the outward pressure of the links 25, which serve as a toggle. The links are preferably in sections connected by turnbuckles 30, whereby they may be nicely adjusted in length.

The arm 22 is preferably provided with an antifriction-roller 32, which bears against the segment 23. The post 24 is guided by a sleeve 33, supported from the oscillating ring. The part 23 is termed a "segment" by reason of its function, which is to provide a bearing-surface for the roller 32 through the segmental arc in which this portion of the wheel oscillates when the wheel is swung for steering purposes. The required size of this segment is dependent upon the distance of the post 24 from the axis of oscillation. A post 24 at the axis of oscillation would require no enlarged bearing-surface. Owing to the elongated bearing provided by the sleeve 33 the post 24 will be pushed upwardly without binding when upward pressure is applied to any portion of the segment 23.

It is of course to be understood that each of the steering-wheels of the vehicle may be similarly equipped with a brake and brake-setting mechanism, and the brake-operating lever may be connected to any suitable point for manual control.

Having thus described my invention, what I claim as new, and desire to secure by Letters Patent, is—

1. In a motor-driven vehicle, the combination with a steering-wheel, pivotally supported substantially in a vertical plane thereof, and driving connections flexibly jointed substantially in the same plane, of a brake carried by the wheel-support; a brake-operating member swinging with the brake and wheel-support about said pivotal axis; an actuating member mounted upon the vehicle-frame at one side of the axis of the wheel-pivot and adapted to transmit motion to the operating member in various positions of wheel-adjustment.

2. In a motor-driven vehicle, the combination with a steering-wheel, pivotally supported substantially in a vertical plane thereof, and a relatively stationary axle provided with a pivotal wheel-supporting member, of a brake carried by said wheel-supporting member in operative relation to the wheel; a brake-operating member mounted upon the wheel-supporting member at one side of said pivotal axis; and a brake-actuating member movably mounted on the relatively stationary axle at one side of said pivotal axis and adapted to transmit motion to the brake-operating member in various positions of wheel-adjustment.

3. The combination of a relatively stationary support, a pivotally-swinging non-rotatable support connected therewith, a wheel mounted on said swinging support in a plane cutting its pivotal axis, a brake located at one side of said plane and connected with the swinging support, brake-operating mechanism mounted upon the swinging support at one side of the pivotal axis, and actuating mechanism on the stationary support, arranged to engage and actuate the operating mechanism at various points in its arc of oscillation.

4. In a motor-driven vehicle, the combination with a relatively stationary axle, a wheel-supporting member pivotally connected therewith, a wheel mounted on said member substantially in the plane of its pivotal connection with said axle, and driving connections for said wheel, flexibly jointed, substantially in the plane of the wheel, of a hand-brake supported from said wheel-supporting member in operative relation to said wheel; a post having sliding bearings in the wheel-supporting member, and toggle connection with the brake; and brake-actuating mechanism mounted on said axle at one side of the wheel, and adapted to communicate motion to said post in various positions of wheel-adjustment.

5. The combination of a relatively stationary axle; a swinging support pivotally connected therewith; a wheel rotatably mounted on said swinging support, substantially in a plane cutting the pivotal axis thereof; a brake connected with said swinging support at one side of said pivotal axis; a brake-operating member mounted on said swinging support; and an actuating member mounted on the stationary axle; said operating member being unconnected with the brake-actuating member and arranged with a segmental bearing-surface adapted to be engaged by said brake-actuating member at various points in its arc of oscillation.

6. The combination of a relatively stationary axle; a swinging support pivotally connected therewith; a wheel rotatably mounted on said swinging support; a brake connected with said swinging support; a brake-operating member mounted on said swinging support; and provided with an elongated guide bearing thereon; an actuating member mounted on the relatively stationary support and adapted to communicate motion to the operating member, said members being unconnected, and said operating member being provided with a segmental bearing-surface, curved in the arc of oscillation of the operating member, and adapted to be engaged by the actuating member in various positions of relative adjustment.

In testimony whereof I affix my signature in the presence of two witnesses.

HANS THEODORE HANSEN.

Witnesses:
LEVERETT C. WHEELER,
JAS. B. ERWIN.